United States Patent
Park et al.

(10) Patent No.: US 9,847,147 B2
(45) Date of Patent: Dec. 19, 2017

(54) ARTICULATED MANIPULATOR

(71) Applicant: DOOSAN HEAVY INDUSTRIES & CONSTRUCTION CO., LTD., Changwon-si (KR)

(72) Inventors: Kwang Yong Park, Changwon-si (KR); Jin Gwi Byeon, Changwon-si (KR); Seon Ho Lee, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 337 days.

(21) Appl. No.: 14/600,828

(22) Filed: Jan. 20, 2015

(65) Prior Publication Data
US 2015/0206607 A1    Jul. 23, 2015

(30) Foreign Application Priority Data
Jan. 17, 2014  (KR) .................. 10-2014-0006212

(51) Int. Cl.
| | | |
|---|---|---|
| B25J 5/02 | (2006.01) | |
| G21C 17/013 | (2006.01) | |
| B25J 9/06 | (2006.01) | |
| B25J 9/08 | (2006.01) | |
| B25J 9/04 | (2006.01) | |
| B25J 11/00 | (2006.01) | |
| B25J 17/00 | (2006.01) | |

(Continued)

(52) U.S. Cl.
CPC .............. *G21C 17/013* (2013.01); *B25J 5/02* (2013.01); *B25J 9/046* (2013.01); *B25J 9/06* (2013.01); *B25J 9/08* (2013.01); *B25J 11/005* (2013.01); *B25J 17/00* (2013.01); *F22B 37/005* (2013.01); *G21C 19/207* (2013.01); *G21D 1/006* (2013.01); *Y10T 74/20305* (2015.01)

(58) Field of Classification Search
CPC . G21C 17/013; B25J 9/046; B25J 5/02; B25J 9/06
See application file for complete search history.

(56) References Cited

U.S. PATENT DOCUMENTS

| | | | | |
|---|---|---|---|---|
| 4,766,775 A | * | 8/1988 | Hodge | ............ B25J 9/08 403/13 |
| 2003/0213328 A1 | * | 11/2003 | Grosso | ............ B62D 65/18 74/490.01 |
| 2012/0204670 A1 | * | 8/2012 | Ryland | ............ B08B 9/045 74/490.03 |

FOREIGN PATENT DOCUMENTS

| | | |
|---|---|---|
| JP | H065101 A | 1/1994 |
| JP | H07257693 A | 10/1995 |

(Continued)

OTHER PUBLICATIONS

Chen et al., The Design of Robot for Space Station Operation, Proceedings of the 2012 IEEE International Conference of Robotics and Biomimetic, Dec. 11-14, 2012, Guangzhou, China, pp. 247-252.

*Primary Examiner* — David M Fenstermacher
(74) *Attorney, Agent, or Firm* — Sughrue Mion, PLLC (57) ABSTRACT

Disclosed herein is an articulated manipulator capable of moving a tool such as an inspection device, a processing device, or a welding device to a desired position for inspection or repair of a defect portion in a limited place. The articulated manipulator includes a base plate, a movable unit slidably coupled on the base plate, a rotatable unit rotatably coupled on the movable unit, and a rotation unit rotatably coupled to one side of the rotatable unit.

20 Claims, 5 Drawing Sheets

(51) Int. Cl.
    *F22B 37/00*     (2006.01)
    *G21C 19/20*     (2006.01)
    *G21D 1/00*     (2006.01)

(56) References Cited

FOREIGN PATENT DOCUMENTS

| | | |
|---|---|---|
| KR | 10-1138365 A | 4/2012 |
| KR | 10-2013-0003864 A | 1/2013 |

\* cited by examiner

ARTICULATED MANIPULATOR

CROSS-REFERENCE TO RELATED APPLICATIONS

This application claims priority to Korean Patent Application No. 10-2014-0006212, filed on Jan. 17, 2014 the disclosure of which is incorporated herein by reference in its entirety.

BACKGROUND

Field

Apparatuses and methods consistent with exemplary embodiments relate to a manipulator, and more particularly, to an articulated manipulator capable of moving a tool such as an inspection device, a processing device, or a welding device to a desired position for inspection or repair of a defect portion in a limited place.

Description of the Related Art

A steam generator constituting a nuclear steam supply system of a nuclear power plant is a device which generates dry steam when high-temperature primary coolant supplied from a reactor exchanges heat with secondary coolant outside heat transfer tubes while flowing along the heat transfer tubes inside the steam generator.

A primary system of a nuclear power plant is typically configured by a reactor, a steam generator, a coolant circulation pump, a pressurizer, and the like. Here, the reactor has a control rod and a fuel assembly therein, and heat energy generated in the reactor is transferred to the outside of the reactor through a primary coolant. The primary coolant is circulated through heat transfer tubes via the steam generator.

The steam generator is supplied with secondary coolant which exchanges heat with the primary coolant. The secondary coolant exchanges heat with the high-temperature and high-pressure primary coolant to be vaporized. Steam generated by the steam generator is transferred to a turbine through a pipe so as to drive a generator and generate electric energy.

Figure 1:
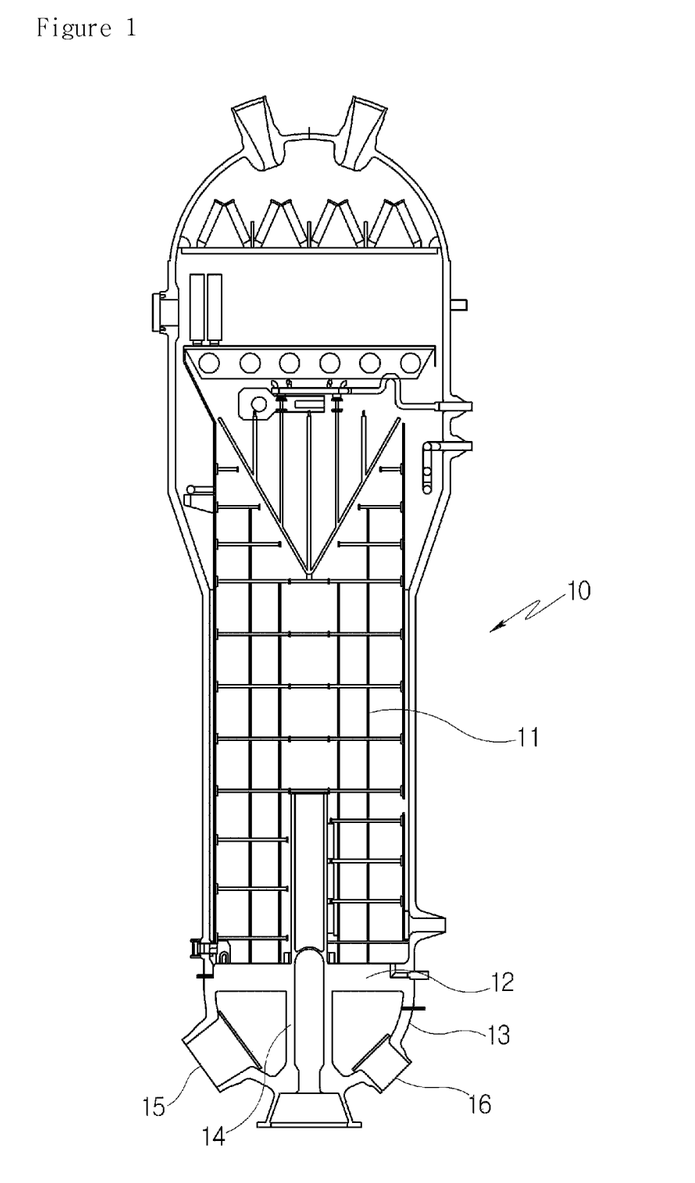
FIG. 1 is a view schematically illustrating an example of a typical steam generator.

FIG. 1 is a view illustrating an example of a typical steam generator.

Referring to FIG. 1, a steam generator 10 has a plurality of heat transfer tubes (several thousand or more heat transfer tubes) 11 therein, and a tube sheet 12 and a channel head 13 are formed at a lower portion of the steam generator 10.

An inner portion of the channel head 13 is partitioned by a partition plate 14, and an inlet 15 and an outlet 16 are formed on an outer peripheral surface of the channel head 13 so as to respectively communicate with spaces partitioned thereby.

Primary coolant discharged from a reactor is introduced into the inner space through the inlet 15 of the channel head 13, exchanges heat with secondary coolant through the heat transfer tubes 11 via the tube sheet 12, and is then discharged to the outlet 16. Accordingly, the tube sheet 12 is formed with through-holes (not shown) communicating with the respective heat transfer tubes 11.

A large number of defects due to corrosion or external impact tend to be generated at welding portions of the partition plate 14 after the steam generator 10 has been operated for a long time. Thus, the defects have to be inspected and repaired in order to prevent safety accidents.

In this case, the inspection and repair are mainly performed by mechanical devices which are remotely controlled from the outside, because of a danger of residual radioactivity and also because of the small space within the channel head 13. Therefore, there is a need for a manipulator capable of accurately locating an inspection device or a repair device at a defect portion in order to improve accuracy of inspection and repair.

Figure 2:
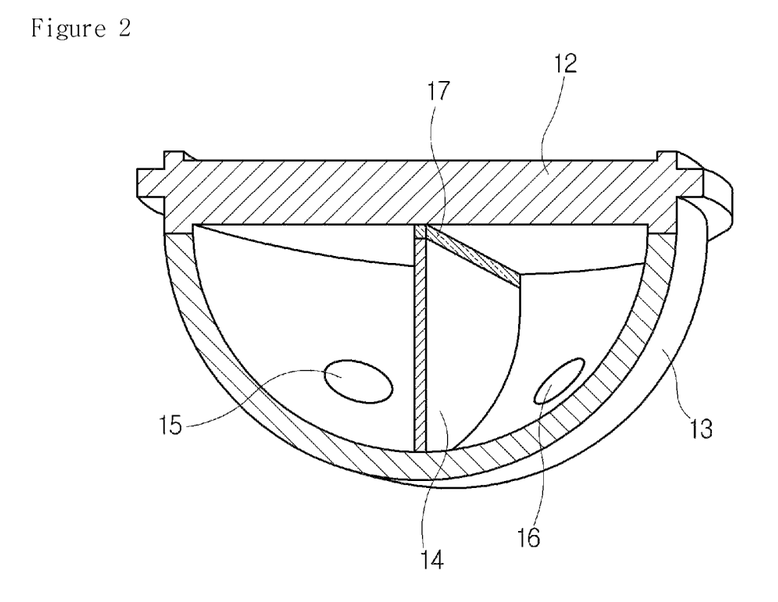
FIG. 2 is a cross-sectional view illustrating various welding portions in a channel head.

FIG. 2 is a cross-sectional view illustrating various welding portions in the channel head.

As shown in FIG. 2, the channel head 13 is provided with welding portions which are respectively formed between the partition plate 14 and the channel head 13, between the partition plate 14 and the tube sheet 12, and between the partition plate 14 and a stub runner 17. The manipulator needs to move the inspection device or the repair device to various positions corresponding to the respective welding portions.

In addition, the inner space of the channel 13 is formed in various sizes according to the standard of the steam generator 10. Accordingly, in order for the manipulator to be applied to the various-sized work spaces, the number of rotary shafts of or shape of the manipulator needs to be actively changed and the shape of the manipulator has to be easily changed for improvement of workability.

SUMMARY

Accordingly, in view of the above-mentioned problems, one or more exemplary embodiments provide an articulated manipulator capable of accurately locating an inspection device or a repair device at a defect portion so as to inspect or repair defects generated in a limited space as in a channel head or pipe of a steam generator.

One or more exemplary embodiments provide an articulated manipulator capable of actively corresponding according to positions of defect generation portions or shapes of spaces requiring inspection or repair and easily performing maintenance, by assembling or disassembling a plurality of rotation modules.

Other objects and advantages of the exemplary embodiments can be understood by the following description. Also, it is obvious to those skilled in the art that the objects and advantages can be realized by the means as claimed and combinations thereof.

In accordance with an exemplary embodiment, an articulated manipulator includes a base plate having a length that is longer than a width thereof, a movable unit slidably coupled to the base plate and configured to slide in a direction of the length of the base plate, a rotatable unit rotatably coupled to an upper side of the movable unit and configured to rotate along a plane which is parallel to a plane on which the base plate is disposed, and a rotation unit rotatably coupled to one side of the rotatable unit.

The rotation unit may comprise a plurality of rotation modules which are configured to be assembled together in a modular manner.

Each of the rotation modules may include a coupling block coupled to one side of the rotatable unit or one side of another adjacent rotation module, and a rotation member rotatably coupled to the coupling block.

Each of the rotation modules may further include a rotary motor provided at one side of the rotation member to rotate the rotation member relative to the coupling block.

Each of the rotation modules may further include an arm coupled to one side of the rotation member.

At least one support member having an adjustable length by an actuation cylinder may be provided at an upper side of the base plate.

A feed motor may be provided at one side of the base plate, a lead screw may be provided in a longitudinal direction of the base plate, and the movable unit may be screwed to the lead screw to slide by driving of the feed motor.

A pair of guide rails may be installed on the base plate and the movable unit may slide along the guide rails.

A drive motor which rotates the rotatable unit relative to the movable unit may be provided at one side of the rotatable unit.

The rotatable unit may horizontally rotate with respect to the movable unit, and the rotation unit may rotate in a direction perpendicular to a rotational direction of the rotatable unit.

An end effector may be provided at one side of the rotation unit.

A processing device having a reaction measurement sensor may be coupled to the end effector.

A support plate may be vertically coupled to one side of the base plate.

In accordance with another exemplary embodiment, an articulated manipulator includes a base plate having a length that is longer than a width thereof, a pair of guide rails installed on the base plate parallel to and along the length thereof, a movable unit slidably installed on the guide rails and configured to rotate along a plane which is parallel to a plane on which the base plate is disposed, a rotatable unit rotatably coupled to an upper side of the movable unit and configured to rotate along a plane which is parallel to a plane on which the base plate is disposed, and a first rotation module which is vertically and rotatably coupled to one side of the rotatable unit.

The first rotation module may include a first coupling block coupled to one side of the rotatable block, a first rotation member rotatably coupled to one side of the first coupling block, and a first rotary motor provided at one side of the first rotation member to rotate the first rotation member relative to the first coupling block.

The first rotation module may further include a first arm coupled to one side of the first rotation member.

A first coupling portion which is protrusively formed at one side of the first coupling block may be coupled to one side of the rotatable unit.

The articulated manipulator may further include a second rotation module which is vertically and rotatably coupled to one side of the first rotation module.

The second rotation module may include a second coupling block coupled to one side of the first rotation module, a second rotation member rotatably coupled to one side of the second coupling block, and a second rotary motor provided at one side of the second rotation member to rotate the second rotation member relative to the second coupling block.

The second rotation module may further include a second arm coupled to one side of the second rotation member.

A second coupling portion which is protrusively formed at one side of the second coupling block may be coupled to a first coupling plate provided at an end of a first arm of the first rotation module.

The articulated manipulator may further include a third rotation module which is vertically and rotatably coupled to one side of the second rotation module.

The third rotation module may include a third coupling block coupled to one side of the second rotation module, a third rotation member rotatably coupled to one side of the third coupling block, and a third rotary motor provided at one side of the third rotation member to rotate the third rotation member relative to the third coupling block.

A third coupling portion which is protrusively formed at one side of the third coupling block may be coupled to a second coupling plate provided at an end of a second arm of the second rotation module.

The articulated manipulator may further include a fourth rotation module which is vertically and rotatably coupled to one side of the third rotation module.

The fourth rotation module may include a fourth coupling block coupled to one side of the third rotation module, a fourth rotation member rotatably coupled to one side of the fourth coupling block, and a fourth rotary motor provided at one side of the fourth rotation member to rotate the fourth rotation member relative to the fourth coupling block.

A fourth coupling portion which is protrusively formed at one side of the fourth coupling block may be coupled to one side of the third rotation member of the third rotation module.

An end effector may be provided at the other side of the fourth rotation member.

A processing device having a reaction measurement sensor may be coupled to the end effector.

At least one support member having an adjustable length by an actuation cylinder may be provided at an upper side of the base plate.

A support plate may be vertically coupled to one side of the base plate.

In accordance with another exemplary embodiment, an articulated manipulator includes a base plate having a length that is longer than a width thereof, a pair of guide rails installed on the base plate parallel to and along the length thereof, a movable unit installed on the base plate so as to be slidable along the guide rails, a rotatable unit coupled to an upper portion of the movable unit to be rotated by a drive motor, and a rotation unit coupled to one side of the rotatable unit to be rotated by a rotary motor, wherein a rotary shaft of the rotatable unit is perpendicular to a rotary shaft of the rotation unit.

The rotation unit may be configured by assembly of a plurality of rotation modules.

Each of the rotation modules may include a coupling block coupled to one side of the rotatable unit or one side of another adjacent rotation module, and a rotation member rotatably coupled to one side of the coupling block to be rotated by the rotary motor.

Each of the rotation modules may further include an arm coupled to one side of the rotation member.

At least one rotary shaft of the plurality of rotation modules may be perpendicular to a rotary shaft of another rotation module.

An end effector may be provided at an end of a rotation module which is lastly assembled in the plurality of rotation modules.

A processing device having a reaction measurement sensor may be coupled to the end effector.

At least one support member having an adjustable length by an actuation cylinder may be provided at an upper side of the base plate.

A support plate may be vertically coupled to one side of the base plate.

It is to be understood that both the foregoing general description and the following detailed description are exemplary and explanatory and are intended to provide further explanation of the invention as claimed.

BRIEF DESCRIPTION OF THE DRAWINGS

The above and/or other objects, features and advantages of the disclosure will be more clearly understood from the following detailed description taken in conjunction with the accompanying drawings, in which.

DESCRIPTION OF SPECIFIC EMBODIMENTS

Hereinafter, an articulated manipulator according to exemplary embodiments will be described in more detail with reference to the accompanying drawings. In the description, the thickness of each line or the size of each component illustrated in the drawings may be exaggerated for convenience of description and clarity.

In addition, terms to be described later are terms defined in consideration of functions of the exemplary embodiments, and these may vary with the intention or practice of a user or an operator. Therefore, such terms should be defined based on the entire content disclosed herein.

In addition, the following embodiments are for the purpose of describing the components set forth in the appended claims only and are not intended to limit the spirit and scope of the invention. More particularly, various variations and modifications are possible in concrete constituent elements of the embodiments, and it is to be understood that differences relevant to the variations and modifications fall within the spirit and scope of the present disclosure defined in the appended claims.

Although an example in which an articulated manipulator is installed in a channel head to inspect and repair a welding portion of a partition plate is described in the following embodiment, the articulated manipulator may be used in any limited place, such as in a pipe of a nuclear power plant, in addition to the examples herein.

Figure 3:
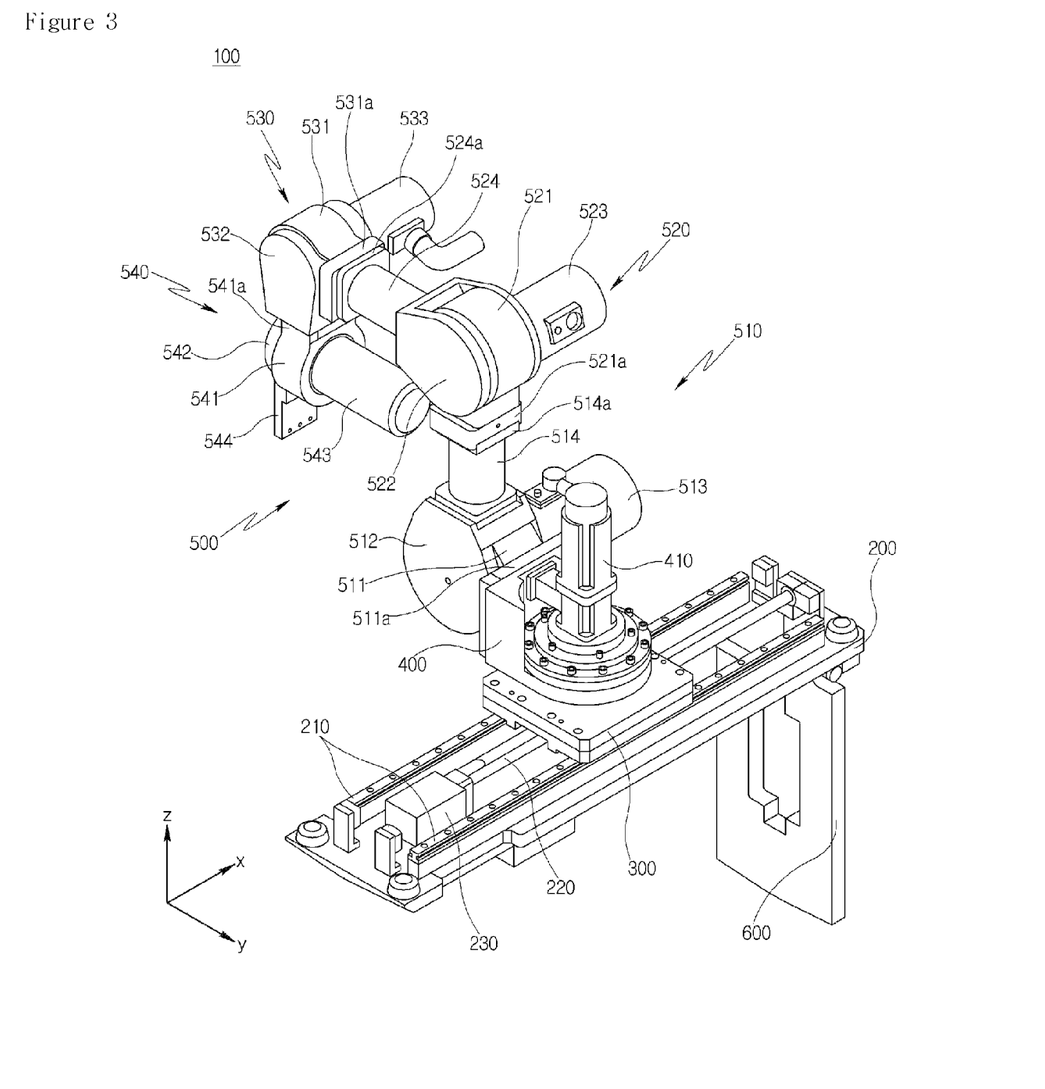
FIG. 3 is a perspective view illustrating an articulated manipulator according to an embodiment of the present invention.
Figure 4:
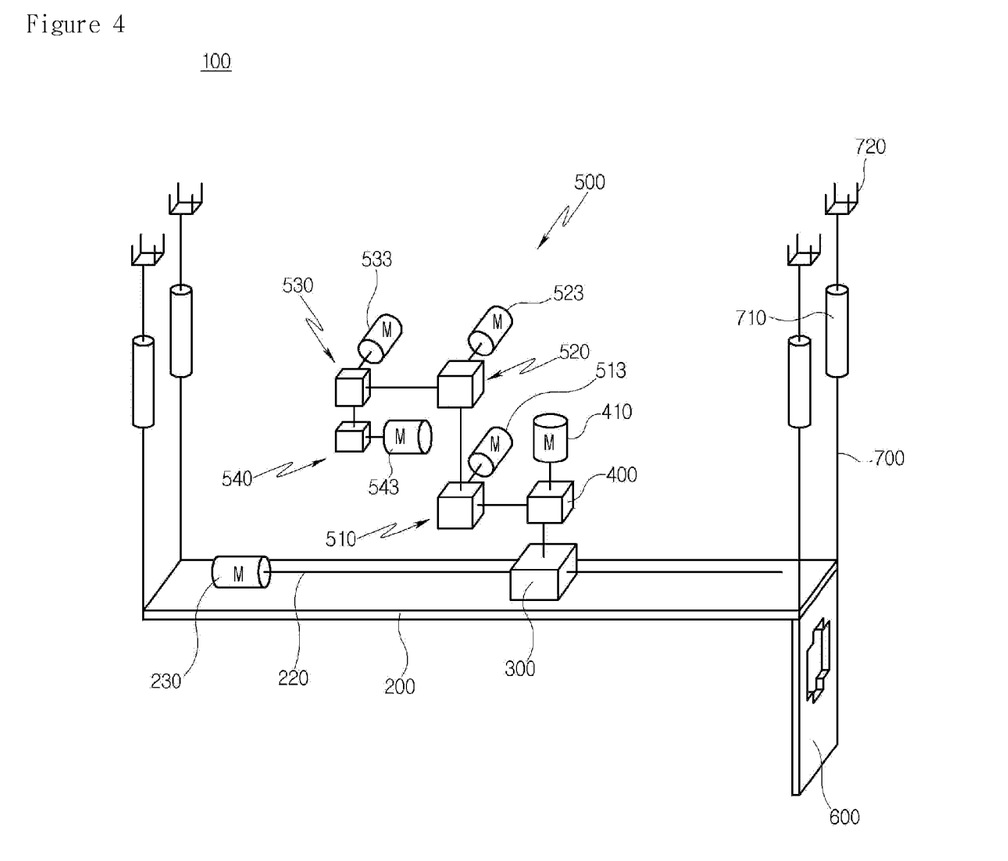
FIG. 4 is a schematic view illustrating the articulated manipulator according to the embodiment of the present invention.

FIG. 3 is a perspective view illustrating an articulated manipulator according to an exemplary embodiment. FIG. 4 is a schematic view illustrating the articulated manipulator according to the exemplary embodiment.

As shown in FIGS. 3 and 4, an articulated manipulator 100 according to an embodiment of the present invention includes a base plate 200, a movable block or unit 300 which is slidably coupled on the base plate 200, a rotatable block or unit 400 which is rotatably coupled on the movable block 300, and a rotation unit 500 which is rotatably coupled to one side of the rotatable block 400.

The base plate 200 supports the movable block 300, the rotatable block 400, and the rotation unit 500, and is of a rectangular plate shape having a length longer than a width.

A pair of guide rails 210 is installed on an upper surface of the base plate 200, and the movable block 300 is installed on the guide rails 210 of the base plate 200 to move in a longitudinal direction of the base plate 200.

In this case, an elongated lead screw 220 is installed between the pair of guide rails 210 in the longitudinal direction of the base plate 200. One end of the lead screw 220 is coupled to a feed motor 230 installed to one side of the upper surface of the base plate 200. That is, the lead screw 220 axially rotates when the feed motor 230 is driven.

The movable block 300 slides along the guide rails 210 in the longitudinal direction of the base plate 200, and is moved by an operation of the feed motor 230. To this end, both sides of a bottom surface of the movable block 300 are formed with rail portions (not shown) coupled to the guide rails 210, and the lead screw 220 is screwed to the movable block 300 so as to pass through a center thereof.

Accordingly, when the lead screw 220 axially rotates during driving of the feed motor 230, the movable block 300 screwed to the lead screw 220 slides along the guide rails 210.

A support plate 600 is vertically coupled to one side of a bottom surface of the base plate 200. The support plate 600 is configured such that the base plate 200 is not moved and is securely supported during installation of the articulated manipulator 100, and one surface of the support plate 600 may be adhered to and/or supported by a partition plate 14 (see FIG. 2) of a channel head 13 (see FIG. 2).

Figure 5:
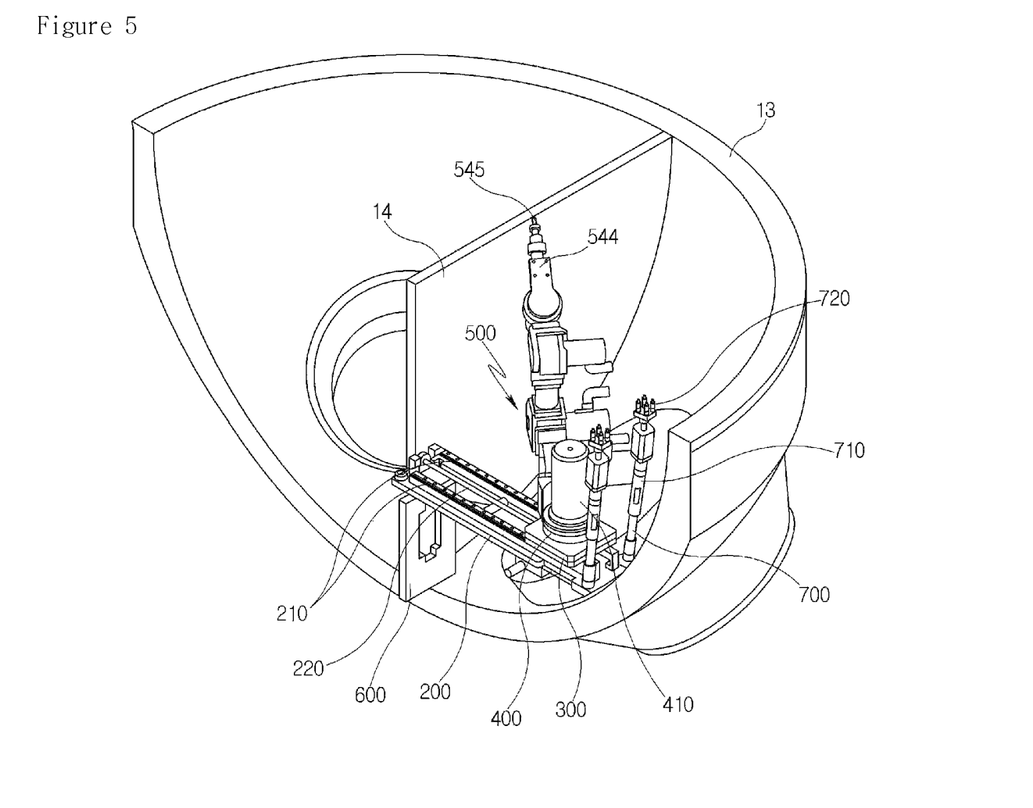
FIG. 5 is a view illustrating a use state of the articulated manipulator according to the embodiment of the present invention.

That is, the support plate 600, coupled to one side of the bottom surface of the base plate 200, may be adhered to and/or supported by one side of the partition plate 14, and the other side of the base plate 200 is supported by an inner wall of the hemispherical channel head 13, so that the base plate 200 is securely installed within the channel head 13 (see FIG. 5).

In this case, at least one support member 700 is provided on the upper surface of the base plate 200. A total of four support members 700 are preferably provided one by one at respective corner portions of the upper surface of the base plate 200. One end of each support member 700 is coupled to the associated corner portion of the upper surface of the base plate 200 and the other end thereof extends upward.

The support members 700 press a tube sheet 12 (see FIG. 2) at an upper portion of the channel head 13 to securely support the base plate 200 by reaction thereof. One side of each support member 700 is provided with an actuation cylinder 710 capable of adjusting a length of the support member 700 and a plurality of jaws 720 spaced apart from each other extend from respective upper ends of the support members 700. A cylinder rod of the actuation cylinder 710 may be elongated and shortened by hydraulic or pneumatic pressure or driving of a motor.

When the support members 700 are elongated upward by the operation cylinders 710 during installation of the base plate 200, the jaws 720 are inserted into the through-holes (not shown) of the tube sheet 12 communicating with heat transfer tubes 11 (see FIG. 2) to push up against the tube sheet 12.

In this case, the reaction force applied to the base plate 200 through the support members 700 presses the base plate 200 and the support plate 600 toward the inner wall of the channel head 13. Thus, the base plate 200 and the support plate 600 are securely supported in a state in which edge portions thereof are laid on the inner wall of the channel head 13.

In this case, all of the jaws 720 at the upper ends of the support members 700 may be inserted into the same through-hole of the tube sheet 12, or the respective jaws 720 may be inserted into separate through-holes. Standards such as the number and diameters of the jaws 720 and a spaced distance between the jaws 720 may be properly selected as necessary.

The rotatable block 400 is rotatably coupled to an upper side of the movable block 300. The rotatable block 400 is coupled to the movable block 300 in a dovetail manner, and rotates relative to the movable block 300 in a horizontal direction on the movable block 300. For example, referring to an x-y-z coordinate system shown in FIG. 3, the movable block 300 slides in a direction parallel with an x-axis and the rotatable block 400 rotates along a plane parallel with an x-y plane.

To this end, a drive motor 410 is installed to an upper side of the rotatable block 400 and a rotary shaft of the rotatable block 400 is coupled to an end of the drive motor 410. That is, the rotatable block 400 rotates in the horizontal direction on the movable block 300 by driving of the drive motor 410.

The rotation unit 500 is rotatably coupled to one side of the rotatable block 400. In this case, a rotational direction of the rotation unit 500 is a direction perpendicular to a rotational direction of the rotatable block 400. For example, the rotation unit 500 rotates along a plane parallel with a z-y plane or a plane parallel with a z-x plane.

The rotation unit 500 is configured by assembly of at least one rotation module. The number of rotation modules for configuring the rotation unit 500 may be properly selected according to work conditions such as an installation place of the articulated manipulator 100 and a position of a defect portion.

For example, when the installation place of the articulated manipulator 100 is narrow or the defect portion is close to the base plate 200, the rotation unit 500 required for the purpose may be sufficiently configured by fewer rotation modules. However, when the installation place of the articulated manipulator 100 is wide or the defect portion is far away from the base plate 200, there is a need to configure the rotation unit 500 having more rotary shafts by assembly of more rotation modules in order for an end effector at an end of the rotation unit 500 to be located close to the defect portion.

Although FIGS. 3 and 4 show an example of configuring the rotation unit 500 by assembly of four rotation modules, the present invention is not limited thereto. For example, the rotation unit 500 may also be configured by one rotation module or may also be configured by assembly of five or more rotation modules, as necessary.

One of the characteristics of the present disclosure is to actively configure the articulated manipulator 100 according to a particular environment of an installation place, a defect portion, and a type of work by assembly of the proper number of rotation modules as necessary.

In addition, the articulated manipulator 100 may be easily transported, assembled, and disassembled since the movable block 300, the rotatable block 400, and the rotation unit 500 are assembled in a modular manner.

In addition, since the plurality of rotation modules having the respective rotary shafts is mutually coupled by bolting in the rotation unit 500, a worker may easily change the number of rotary shafts configuring the rotation unit 500 according to a work condition such as an installation space.

Hereinafter, the articulated manipulator 100 of the present invention will be described with reference to the embodiment shown in FIGS. 3 and 4.

A first rotation module 510 is rotatably coupled to one side of the rotatable block 400.

In this case, the first rotation module 510 includes a first coupling block 511 coupled to one side of the rotatable block 400, a first rotation member 512 rotatably coupled to one side of the first coupling block 511, and a first rotary motor 513 provided at one side of the first rotation member 512.

The first coupling block 511 is of a circular block shape as a whole, and a first coupling portion 511a is protrusively formed at one side of the first coupling block 511. The first coupling portion 511a is coupled to one side of the rotatable block 400 by bolting.

The first rotation member 512 has a cut portion formed at one side thereof so as to surround both side surfaces of the first coupling block 511, and is of a circular block shape as a whole. The first coupling block 511 is received in the cut portion of the first rotation member 512 and the first coupling portion 511a is formed to protrude to the outside of the cut portion.

The first rotary motor 513 is installed to one surface of the first rotation member 512 and a rotary shaft of the first rotary motor 513 is coupled to the first rotation member 512. Accordingly, the first coupling block 511 rotates in the cut portion of the first rotation member 512 when the first rotary motor 513 is operated.

In this case, the rotary shaft of the first rotary motor 513 is installed in a direction parallel with the x-axis with respect to the first rotation member 512, and the first rotation member 512 rotates along the plane parallel with the z-y plane by operation of the first rotary motor 513.

A first arm 514 extending in a direction perpendicular to the rotary shaft of the first rotation member 512 is coupled to one side of an outer peripheral surface of the first rotation member 512, as necessary. A first coupling plate 514a having an extended width is formed for coupling with another rotation module (for instance, a second rotation module) adjacent to an end of the first arm 514.

Meanwhile a second rotation module 520 is formed in the same shape as the first rotation module 510.

That is, the second rotation module 520 includes a second coupling block 521 configured to have a second coupling portion 521a protrusively formed at one side thereof, a second rotation member 522 has a cut portion formed at one side thereof so as to surround both side surfaces of the second coupling block 521 and being rotatably coupled thereto, a second rotary motor 523 provided at one surface of the second rotation member 522, and a second arm 524 configured to extend from one side of the second rotation member 522 and have a second coupling plate 524a formed at an end of the second arm 524.

The first rotation module 510 is assembled to the second rotation module 520 by bolting the second coupling portion 521a of the second rotation module 520 to the first coupling plate 514a of the first rotation module 510.

A rotary shaft of the second rotary motor 523 is installed in the direction parallel with the x-axis with respect to the second rotation member 522, and the second rotation member 522 rotates along the plane parallel with the z-y plane with respect to the second coupling block 521 by operation of the second rotary motor 523.

A third rotation module 530 includes a third coupling block 531 configured to have a third coupling portion 531a protrusively formed at one side thereof, a third coupling block 531 rotatably coupled to a cut portion of the third rotation member 532, and a third rotary motor 533 provided at one surface of the third rotation member 532.

The second rotation module 520 is assembled to the third rotation module 530 by bolting the third coupling portion 531a of the third rotation module 530 to the second coupling plate 524a of the second rotation module 520.

In this case, a rotary shaft of the third rotary motor 533 is installed in the direction parallel with the x-axis with respect to the third rotation member 532, and the third rotation member 532 rotates along the plane parallel with the z-y plane with respect to the third coupling block 531 by operation of the third rotary motor 533.

A fourth rotation module 540 includes a fourth coupling block 541 configured to have a fourth coupling portion 541a protrusively formed at one side thereof, a fourth coupling block 541 rotatably coupled to a cut portion of the fourth rotation member 542, and a fourth rotary motor 543 provided at one surface of the fourth rotation member 542.

The third rotation module 530 is assembled to the fourth rotation module 540 by bolting the fourth coupling portion 541a of the fourth rotation module 540 to one side of the third rotation member 532 of the third rotation module 530. That is, the fourth coupling portion 541a of the fourth rotation module 540 is bolted to one side of the third rotation member 532 without a separate third arm.

In this case, a rotary shaft of the fourth rotary motor 543 is installed in a direction perpendicular to the x-axis with respect to the third rotary motor 533, and thus the fourth rotation member 542 rotates in a direction perpendicular to the rotational direction of the third rotation member 532. For example, in the embodiment shown in FIG. 3, the third rotation member 532 rotates along the plane parallel with the z-y plane, whereas the fourth rotation member 542 rotates along the plane parallel with the z-x plane. Of course, the plane along which the fourth rotation member 542 rotates is varied according to rotation of the third rotation member 532.

The other side of the fourth rotation member 542, which is an opposite side at which the third rotation member 532 is provided, has an end effector 544 as a fastening portion to which an auxiliary device, for example, an inspection device such as a CCD camera (not shown), a processing device such as an end mill 545 (see FIG. 5), or a welding device such as a torch (not shown) is fastened.

That is, the end effector 544 is provided at an end of a rotation module which is lastly assembled when the rotation unit 500 is configured by assembly of the plurality of rotation modules. The last rotation module is preferably configured to rotate in a direction perpendicular to the rotational directions of the other rotation modules.

For example, when the rotation unit 500 is configured by two rotation modules in order to be used in a limited space, a worker may easily remove an unnecessary rotation module by releasing bolts fastened to the rotation module. In this case, the rotary shaft of the second rotation module 520 may be arranged in a direction perpendicular to the rotary shaft of the first rotation module 510.

As an alternative example, when the rotation unit 500 is configured by three rotation modules, the rotary shaft of the third rotation module 530 may be arranged in a direction perpendicular to the rotary shafts of the first and second rotation modules 510 and 520.

Meanwhile, when the rotation unit 500 is configured to have more rotary shafts by an increase of the number of rotation modules, the number of rotary shafts of the rotation unit 500 may be easily increased in such a manner that one side of an existing rotation module is disassembled by releasing of bolts and another prepared rotation module is assembled between existing rotation modules or to one side of an existing rotation module by bolting.

FIG. 5 is a view illustrating a use state of the articulated manipulator according to an exemplary embodiment. FIG. 5 shows an example of repairing a defect of a welding portion of the partition plate installed in the channel head of the steam generator using the articulated manipulator of the present invention.

Hereinafter, an operation of the articulated manipulator 100 according to the exemplary embodiment will be described with reference to FIGS. 3 to 5.

First, the articulated manipulator 100 is installed at a place requiring inspection or repair work of a defect portion.

In this case, the articulated manipulator 100 is transported into the channel head 13 through a manway (not shown) thereof and installed in the channel head 13. The articulated manipulator 100 may also be transported into the channel head 13 after assembly thereof is completed at an external location, and may also be immediately assembled in the channel head 13 in a manner of adding or subtracting the number of rotation modules as necessary.

The articulated manipulator 100 is installed in such a manner that the support plate 600 is adhered to and/or supported by one side of the partition plate 14, the opposite edge of the base plate 200 is supported by the inner wall of the channel head 13, and then the jaws 720 provided at the upper ends of the support members 700 are inserted into the through-holes of the tube sheet 12 by driving of the actuation cylinders 710.

When the support members 700 are extended by the actuation cylinders 710, the upper ends of the support members 700 press and push up against the bottom surface of the tube sheet 12. Since the tube sheet 12 is securely fixed to the upper side of the channel head 13, the lower end of the support plate 600 is pressed toward the bottom surface of the channel head 13 by the reaction thereof and the opposite edge of the base plate 200 is pressed toward the inner wall of the channel head 13 so that the base plate 200 is securely supported.

Although the example in which the support plate 600 is vertically installed to the partition plate 14 has been described in the embodiment shown in FIG. 5, the installation form of the base plate 200 including the support plate 600 may be freely changed according to a type of work such as positioning, inspection, or repair of the defect portion. For example, the support plate 600 may also be horizontally installed to the partition plate 14.

Next, the end effector 544 at the end of the rotation unit 50 is located at the defect portion. In this case, the position of the end effector 544 is displaced in such a manner that the movable block 300 linearly moves along the base plate 200, the rotatable block 400 horizontally rotates on the movable block 300, and each rotation module vertically rotates.

The position displacement of the end effector 544 is remotely controlled by a controller (not shown) at the outside of the steam generator, and various motors required for the position displacement is driven by power supply through a power cable (not shown) connected to the outside.

In order to grasp the progress of defect inspection or repair work of the welding portion, a CCD camera may be installed to the end effector 544. In this case, the CCD camera is preferably configured such that coordinate data is extractable through a vision image processing function, and the controller calibrates a position coordinate using the extracted coordinate data during the inspection or repair work.

In addition, when machining (for instance, grinding) of the defect portion is required to repair the welding portion, a processing device such as an end mill 545 may be installed to the end effector 544.

In this case, since the base plate 200 is securely supported in the channel head 13 by the reaction transferred through the support members 700, it may be possible to enhance accuracy and efficiency of the work by preventing movement of the base plate 200 due to the reaction generated during processing even when the processing device is installed to the end effector 544 such that the defect portion is machined.

A reaction sensor (not shown) is preferably installed at one side of the processing device or one side of the end effector 544. In this case, when the reaction applied during machining exceeds a preset value, it may be possible to prevent damage of the steam generator by controlling the end effector 544 or the processing device such that the feed speed of the end effector 544 moving along the welding portion or the rotational speed of the processing device such as the end mill 545 is reduced.

The articulated manipulator 100 of the exemplary embodiment may be utilized at inspection and repair work of sealed welding portions of the heat transfer tubes 11 (see FIG. 1), and may be used to locate an inspection device or a repair device at a desired point in a limited place such as the pipe of the nuclear power plant in which access of the work is limited.

In addition, since each component is configured in a modular manner to be easily assembled and disassembled, it may be possible to cope with conditions such as an installation place, a position of a defect portion, and a type of required work by actively changing the overall configuration of the articulated manipulator 100.

That is, the various rotation modules may be easily assembled to or disassembled from each other by fastening or releasing of bolts in a state in which the respective rotation modules for configuring the rotation unit 500 are separately manufactured and prepared. Therefore, the articulated manipulator 100 having the proper number of rotary shafts may be configured according to an installation space. In addition, the articulated manipulator 100 is linearly moved by the movable block 300, horizontally rotated by the rotatable block 400, and vertically rotated by the plurality of rotation modules which is independently and rotatably operated. Therefore, the end effector 544 may perform the accurate inspection and repair work while smoothly moving along the curved surface.

As is apparent from the above description, an articulated manipulator according to exemplary embodiments may be easily moved and installed in a limited place such as the inside of a channel head or pipe of a steam generator.

In addition, it may be possible to locate an inspection device or a repair device at various positions in different spaces by selectively assembling a plurality of rotation modules as necessary, and the manipulator may be easily transported, assembled, and disassembled since joints thereof are assembled in a modular manner by bolting.

In addition, since any failed rotation module of the rotation modules may be replaced with another prepared rotation module, maintenance is easily performed.

In addition, since a base plate is securely supported by a support member, repair work may be accurately performed by preventing movement of a processing tool when a defect portion is processed.

Furthermore, a welding portion may be prevented from being damaged during the repair work by controlling an operation of the processing tool according to a processing reaction measured by a reaction sensor.

While the present disclosure has been described with respect to the specific embodiments, it will be apparent to those skilled in the art that various changes and modifications may be made without departing from the spirit and scope of the invention as defined in the following claims.

What is claimed is:

1. An articulated manipulator comprising:
   a base plate having a length that is longer than a width thereof;
   a movable unit slidably coupled to the base plate, and configured to slide in a direction of the length of the base plate;
   a rotatable unit rotatably coupled to an upper side of the movable unit, and configured to rotate along a plane which is parallel to a plane on which the base plate is disposed; and
   a rotation unit rotatably coupled to one side of the rotatable unit and comprising a plurality of rotation modules which are configured to be assembled together in a modular manner.

2. The articulated manipulator according to claim 1, wherein each of the rotation modules comprises a coupling block coupled to one side of the rotatable unit or one side of another adjacent rotation module, and a rotation member rotatably coupled to the coupling block.

3. The articulated manipulator according to claim 2, wherein each of the rotation modules further comprises a motor provided at one side of the rotation member to rotate the rotation member relative to the coupling block.

4. The articulated manipulator according to claim 2, wherein at least one of the rotation modules further comprises an arm coupled to one side of the rotation member.

5. The articulated manipulator according to claim 1, further comprising at least one support member having an adjustable length which is shortened and lengthened by an actuation cylinder, wherein the at least one support member is provided at an upper side of the base plate.

6. The articulated manipulator according to claim 1, further comprising a feed motor provided at one side of the base plate, a lead screw provided along a longitudinal direction of the base plate, and wherein the movable unit is screwed to the lead screw so as to slide along the longitudinal direction of the base plate by driving of the feed motor.

7. The articulated manipulator according to claim 1, wherein the rotatable unit horizontally rotates with respect to the movable unit, and the rotation unit rotates in a direction perpendicular to a rotational direction of the rotatable unit.

8. The articulated manipulator according to claim 1, further comprising an auxiliary device fastening portion provided at one side of one of the rotation modules.

9. The articulated manipulator according to claim 1, further comprising a support plate vertically coupled to a portion of a bottom surface of the base plate located at a longitudinal end of the base plate.

10. An articulated manipulator comprising:
    a base plate having a length that is longer than a width thereof;
    a pair of guide rails installed on an upper surface of the base plate parallel to and along the length thereof;
    a movable unit slidably installed on the guide rails, so as to be disposed above the upper surface of the base plate, and configured to slide in the direction of the length of the base plate;
    a rotatable unit rotatably coupled to an upper side of the movable unit, and configured to rotate along a plane which is parallel to a plane on which the base plate is disposed; and
    a first rotation module vertically and rotatably coupled to one side of the rotatable unit.

11. The articulated manipulator according to claim 10, wherein the first rotation module comprises a first coupling block coupled to one side of the rotatable unit, a first rotation member rotatably coupled to one side of the first coupling block, and a first rotary motor provided at one side of the first rotation member to rotate the first rotation member relative to the first coupling block.

12. The articulated manipulator according to claim 11, wherein the first rotation module further comprises a first arm coupled to one side of the first rotation member.

13. The articulated manipulator according to claim 11, further comprising a first coupling portion extending from one side of the first coupling block which is coupled to one side of the rotatable unit.

14. The articulated manipulator according to claim 10, further comprising a second rotation module which is vertically and rotatably coupled to one side of the first rotation module.

15. The articulated manipulator according to claim 14, wherein the second rotation module comprises a second coupling block coupled to one side of the first rotation module, a second rotation member rotatably coupled to one side of the second coupling block, and a second rotary motor provided at one side of the second rotation member to rotate the second rotation member relative to the second coupling block.

16. The articulated manipulator according to claim 15, wherein the second rotation module further comprises a second arm coupled to one side of the second rotation member.

17. The articulated manipulator according to claim 16, further comprising a second coupling portion formed at one side of the second coupling block which is coupled to a first coupling plate provided at an end of a first arm of the first rotation module.

18. The articulated manipulator according to claim 10, further comprising at least one support member having an adjustable length that is adjusted by an actuation cylinder, wherein the at least one support member is provided at an upper side of the base plate.

19. An articulated manipulator comprising:
a base plate having a length that is longer than a width thereof;
a pair of guide rails installed on an upper surface of the base plate parallel to and along the length thereof;
a movable unit installed on the base plate and disposed above the upper surface of the base plate, so as to be slidable along the guide rails;
a rotatable unit coupled to an upper portion of the movable unit to be rotated by a drive motor; and
a rotation unit coupled to one side of the rotatable unit to be rotated by a rotary motor and comprising a plurality of rotation modules,
wherein a rotary shaft of the rotatable unit is perpendicular to a rotary shaft of the rotation unit.

20. The articulated manipulator according to claim 19, wherein each of the rotation modules comprises a coupling block coupled to one side of the rotatable unit or one side of another adjacent rotation module, and a rotation member rotatably coupled to one side of the coupling block to be rotated by the rotary motor.

\* \* \* \* \*